United States Patent [19]
Poole

[11] 3,831,981
[45] Aug. 27, 1974

[54] TOWING CONNECTIONS

[76] Inventor: Harold George Poole, Aspenden House, Aspenden, England

[22] Filed: Nov. 29, 1972

[21] Appl. No.: 310,580

[30] Foreign Application Priority Data
Nov. 30, 1971 Great Britain.................... 55545/71

[52] U.S. Cl............................................ 280/479 R
[51] Int. Cl.............................................. B60d 1/00
[58] Field of Search ............ 280/479, 492, 493, 494

[56] References Cited
FOREIGN PATENTS OR APPLICATIONS
475,862    8/1951   Canada........................... 280/479 A
1,331,927  12/1961  France........................... 280/479 A

*Primary Examiner*—Leo Friaglia
*Assistant Examiner*—Randall A. Schrecengost
*Attorney, Agent, or Firm*—Watson, Cole, Grindle & Watson

[57] ABSTRACT

A towing connection comprises two conventional power operated vertically moving swing arms on a tractor between which a first part is mounted to pivot about an axis extending fore and aft of the vehicle. A second part mounted on a tractor is rotatably supported on the first part for rotation about an upright axis. A locking device holds the first and second parts together so that the connection is rigid in a vertical plane and articulation in a vertical plane takes place at the attachment points of the lift arms to the tractor.

8 Claims, 10 Drawing Figures

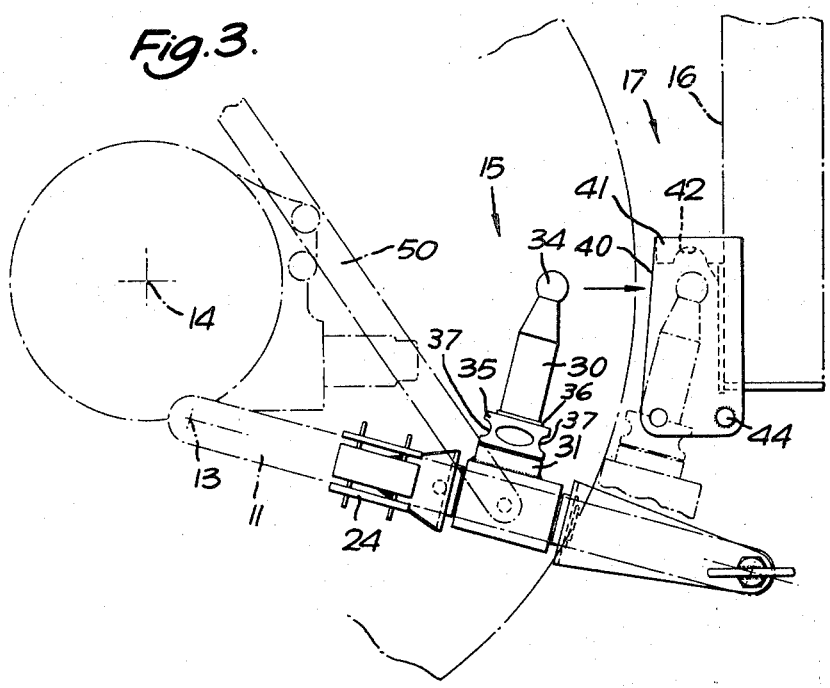
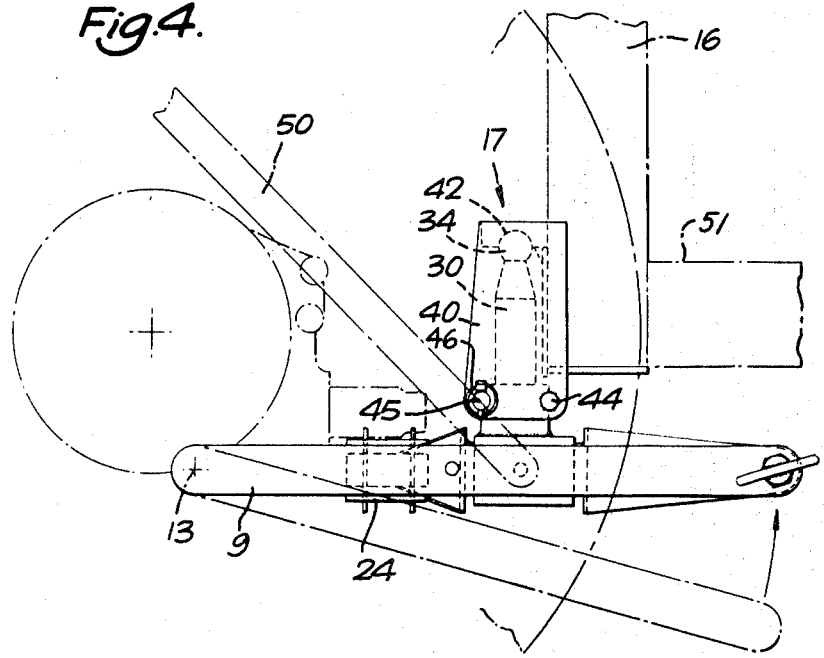

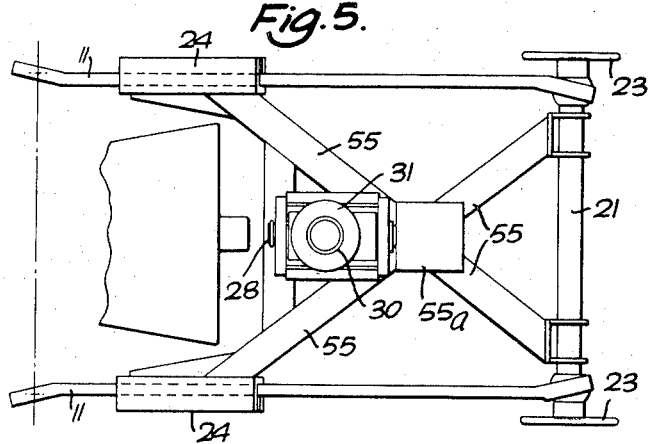
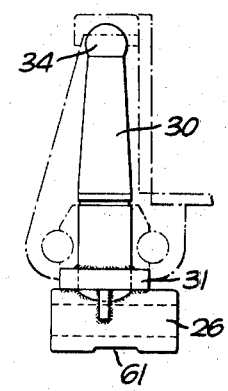
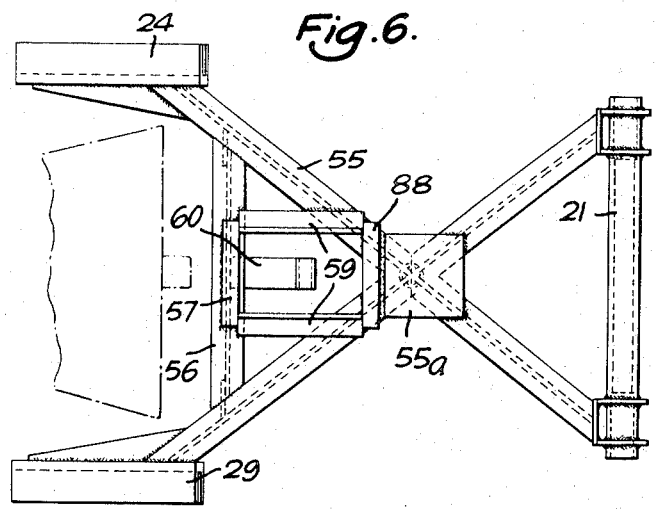
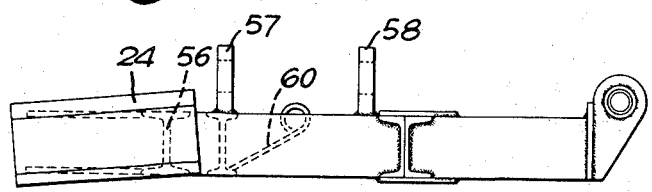

3,831,981

TOWING CONNECTIONS

BACKGROUND TO THE INVENTION

1. Field of the Invention

This invention relates to towing connections and is particularly, although not exclusively applicable to towing connections for use between tractors and single axle trailers in which a part of the load of the trailer is borne by the tractor.

2. Description of the Prior Art

A towing connection is known from U.S. Pat. No. 3,124,372 which comprises means permitting articulation in the connection about three axes mutually at right angles, hitching means joining adjacent members of the towing connection comprising abutments on the members, hitching being effected by relative movement of the vehicles towards one another first to engage the abutments and then swing upwardly the adjacent members about the abutments to a position appropriate for towing and locking means to hold the members in said position. Relatively large forces are imposed on the components in effecting engagement of the connection and this necessitates heavy and therefore permanent structures on the towing and towed vehicles. This restricts the versatility of the towing vehicle for other purposes.

It is an object therefore to improve the present invention to provide a towing connection of the type described in U.S. Pat. No. 3,124,372 in which the components of the structure can be substantially lighter and, on the towing vehicle may, if required, be a nonpermanent structure.

SUMMARY OF THE INVENTION

The invention provides a towing connection comprising a first coupling element, means to mount said element on a towing vehicle for swinging movement about an axis extending transversely of the vehicle, a second coupling element engageable with the first element for mounting on a trailer, and locking means to lock said first and second elements together when engaged against relative rotation other than relative rotation about a vertical axis, characterised in that power means are provided for swinging said first element upwardly to engage and raise the second element on to a towing position.

It will be appreciated that since the coupling elements are engaged and raised together into the towing position by power means the elements can be relatively tightly constricted since they do not have to withstand the forces imposed on the elements in the arrangement described in the U.S. Pat. No. 3,124,372 referred to earlier.

BRIEF DESCRIPTION OF THE DRAWINGS

FIG. 3 is a side view of the parts of the towing connection immediately prior to engagement thereof;

FIG. 4 is a side view of the parts of the towing connection fully engaged.

FIG. 5 is a plan view of a further form of the towing connection;

FIG. 6 is a plan view of part of the towing connection shown in FIG. 5;

FIG. 7 is a side view of the part of the connection shown in FIG. 6;

FIG. 8 is a side view of a further part of the connection.

DESCRIPTION OF THE PREFERRED EMBODIMENTS

Figure 1:
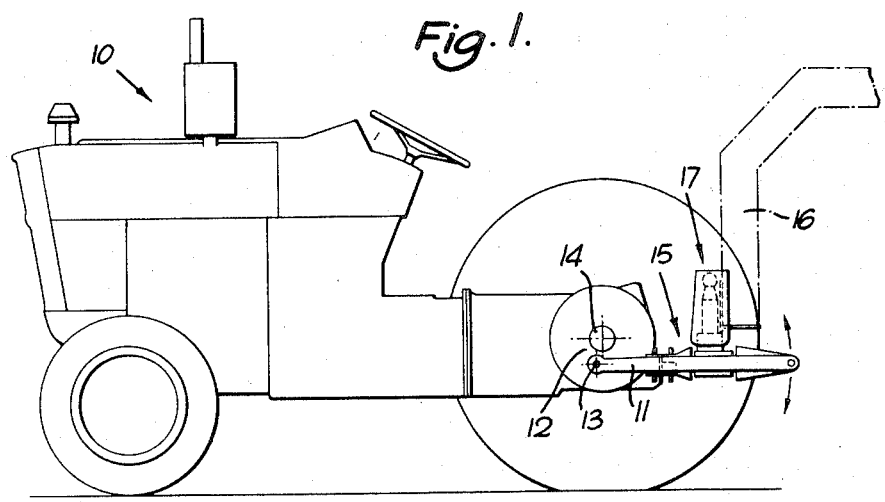
FIG. 1 is a side elevation view of a tractor connected to a trailer by a towing connecting in accordance with the invention.

Reference is first made to FIG. 1 of the drawings in which a conventional agricultural tractor is indicated at 10. The tractor is equipped at the rear with the conventional pair of lift arms 11 pivotally mounted on the rear axle casing 12 for rotation about an axis 13 extending parallel to the rear wheel axis 14 and immediately below and forward of the axis 14. Thus any downward load imposed by said arms on the tractor tends to force both the front and rear of the tractor downwardly and there is no tendency to tip up the tractor whatever the tractor load. As described later, the lift arms 11 may alternatively be pivoted on the tractor slightly to the rear of the axis 13 in which case a minimal tipping load is imposed by the trailer on the tractor about the axis 13 but this is negligible compared with the weight of the tractor.

The arms 11 extend generally rearwardly of the rear wheel axis and a lifting mechanism operated by a hydraulic ram or rams is connected to the arms to swing the arms in generally vertical planes about said axis 13. The mountings of said arms further permit the arms to swing towards and away from one another as is conventional.

A first part 15 of a towing connection is mounted on the arms and will be described in greater detail later. The towing connection is used to hitch a trailer (not shown) to the tractor. The trailer is of the single axle type in which the axle is located to the rear of the trailer so that a part of the trailer load is imposed downwardly on the towing connection. At the forward end of the trailer there is a goose neck shaped draw bar 16 and mounted on the lower end at the front of the draw bar is a second part 17 of the towing connection.

Figure 2:
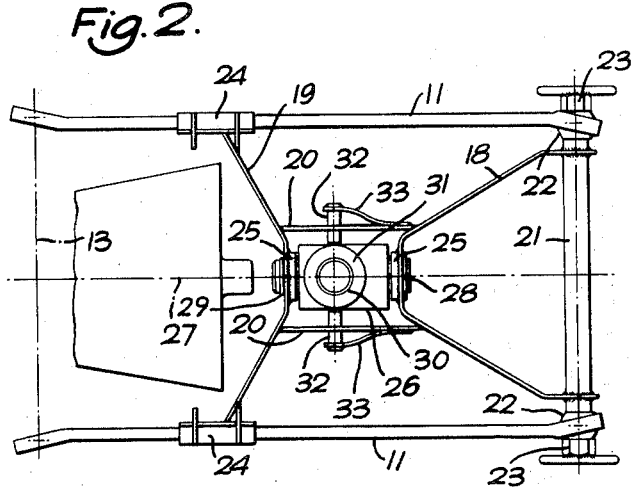
FIG. 2 is a plan view of the part of the towing connection which is secured to the tractor.

The mounting of the first part of the towing connection on the arms 11 will now be described with reference to FIG. 2. A rigid generally X-shaped base structure is located between arms 11 comprising two oppositely facing V-shaped members 18, 19 both of which are flattened at their apices. The members are rigidly joined together adjacent their apices by two spaced parallel plates 20, which are welded at their ends to the members 18 and 19 to form a box with the apices of the members 18 and 19. The outer ends of the member 18 are welded to a hollow shaft 21. The rearmost ends of the lift arms 11 are provided with the conventional universal ball trunnions 22. The shaft 21 is located between the trunnions and the ends of the arms 11 are secured to the shaft by swing headed bolts 23 passing through the trunnions into the ends of the shaft which is internally screw-threaded to receive the bolts. The member 18 is thus suspended between the arms and the arms are held against separation while they may still move up and down.

The ends of the member 19 are each provided with a channel 24 which channels engage around the arms 11 thus supporting member 19 on the arms.

Rings 25 are welded to the adjacent faces of the apices of the members 18 and 19. A hollow cylindrical hub 26 is mounted for rotation about an axis 27 which extends generally fore and aft of the vehicle on a pin 28 which extends through the apices and rings 25. The pin has a head at one end and a spring retainer 29 engages in a slot in the pin at the other end to hold the pin in situ.

The hub 26 carries an upstanding post 30 which has an enlarged diameter base 31. The hub is prevented from rotation about the pin 28 before the towing connection is made by two laterally extending pins 32 mounted in the side plates 20 which engage in recesses formed in the surface of the hub. The pins are urged into engagement with the hub by spring leaves 33 welded to the plates 20.

It will be appreciated that due to the weight of the components of the towing connection, the above parts can conveniently be mounted on the arms 11 by first mounting the base structure with the hub 26, post 30 and pin 28 omitted between the arms. The hub 26 is then located with the pin 30 in an upright position between the apices of the base structure members by the pin 27.

Reference is now made to FIG. 3 of the drawings in which further details of the post are shown. The upper end of the post 30 terminates in a part spherical bearing 34 for engaging the second part 17 of the coupling as described later.

A collar 35 encircles the post immediately above the base 31 and is rotatable with respect to the post. The collar is held against upward movement with respect to the post by a circlip 36 which engages in a groove in the post. The outer periphery of the collar is formed with four circumferentially spaced part-cylindrical recesses 37.

The second part 17 of the towing connection as shown in FIG. 3 comprises an upright channel section member 40 which faces forwardly of the draw bar 16. The channel section is open at its lower end and is closed at its upper end by an end wall 41, the underside of which is formed with a part-spherical recess 42 to mate with the spherical bearing 34 in the post 30.

Adjacent the lower end of the channel there is located a fixed pin 44 extending across the channel adjacent the channel rear wall. The pin is spaced from the upper end wall 41 so that it is engageable in one of the part-cylindrical recesses 37 in the collar 35 on the post 30. A second pin 45 extends between the walls of the channel adjacent the open end of the channel to engage a second recess 37 in the opposite side of the collar and thereby retain the post in the channel is described below. The pin 45 is removable having a head at one end and a releasable spring clip 46 at the other end to hold the pin in situ.

Operation of the towing connection will now be described with reference to FIGS. 3 and 4. In FIG. 3 the arms 11 of the tractor have been swung downwardly by the operating mechanism which includes links 50 connected to the arms to lower the part 15 of the connection. The forward end of the trailer is at this point supported by the conventional skid or jack.

The tractor is then reversed to bring the post 30 into the channel 40 on the trailer draw bar as shown in dotted outline on FIG. 3. The part-spherical bearing is then located immediately below the seat 42. The operating mechanism is then used to raise the arms 11 and the bearing 34 is then engaged with the seat 42 and further raising of the arms raises the channel and with it the forward end of the trailer. In so doing the post 30 swings into the channel until the collar 35 on the post engages the fixed pin 44 in the channel. The collar is joggled round until the pin 44 enters one recess 37 in the collar as shown in FIG. 4. The pin 45 is then inserted across the channel and locked in place by its spring clip 46. The collar could, of course, be locked in the channel by other holding means such as a gate device.

The parts 15, 17 of the connection are now locked together in a vertical plane but can rotate with respect to one another in a horizontal plane about the axis of the post to permit articulation of the tractor and trailer in a horizontal plane for normal changes of direction. To permit articulation of the tractor and trailer in a vertical plane, the operating mechanism used to raise the arms 11 is released so that the arms 11 are feee to pivot about the axis 13 of their mounts on the tractor.

Further, canting of the tractor and trailer about a fore and aft axis is permitted by rotation of the post 30 about its mounting pin 28 on the base structure. The pins 32 are arranged to be driven out of their recesses in the hub 26 to permit the hub to rotate on the pin 28 when sufficient torque is applied to it.

It will be appreciated that the towing connection is released by reversing the connection procedure outlined above. It will also be appreciated that when the tractor is not required for towing, the base structure can readily be removed from the lift arms 11 so that they can be used for other implements.

The arrangements of FIGS. 3 and 4 above differ slightly from that of FIG. 1 in that the axis 13 of rotation of the lift arms is very slightly to the rear of the axis 14 of the rear wheels so that in this case the trailer load does not impose any downward load on the front of the tractor but, since the axis 13 is only just to the rear of the axis 14, only a very small tipping force is applied to the tractor by the trailer which is more than balanced by the weight of the tractor.

FIGS. 3 and 4 of the drawings also show part of a conventional straight draw bar 51 for the trailer instead of the gooseneck draw bar 16. Where a straight draw bar is provided the second part 17 of the towing connection is mounted securely on the forward end of the draw bar.

It will be understood that where the tractor does not have conventional lift arms 11 similar arms to that described above or, possibly a single arm will be provided.

The modified towing connection shown in FIGS. 5 to 8 is closely similar to that described in FIGS. 1 to 4 above and like parts have been allotted the same reference numerals. The main differences are that the rigid generally X-shaped base structure located between the arms 11 is fabricated from I-section beams 55 which are welded together at the centre of the X and a plate 55a covers the joint. Forwardly of the centre of the structure there is a cross member 56 extending between the limbs of the structure. The upstanding lug 57 is mounted at the centre of the cross member 56 having a central bore (not shown) and a similar lug 58 is mounted just forward of the centre of the X-shaped structure. The lugs 57, 58 are connected by side walls 59. The hub at the lower end of the post 30 is mounted between the lugs 57, 58 on the pin 28 which extends through the lugs and is held in place by a spring clip.

To hold the post 30 in a generally upright position before engagement of the towing connection there is a spring steel finger 60 secured to the cross member 56, and extending upwardly between the lugs 57 and 58. The end of the finger is wound into cylindrical form and bears on a flat cut on the underside of the hub 26 indicated at 61 in FIG. 8.

The arrangement is otherwise generally similar to that described with reference to FIGS. 1 to 4.

Figure 9:
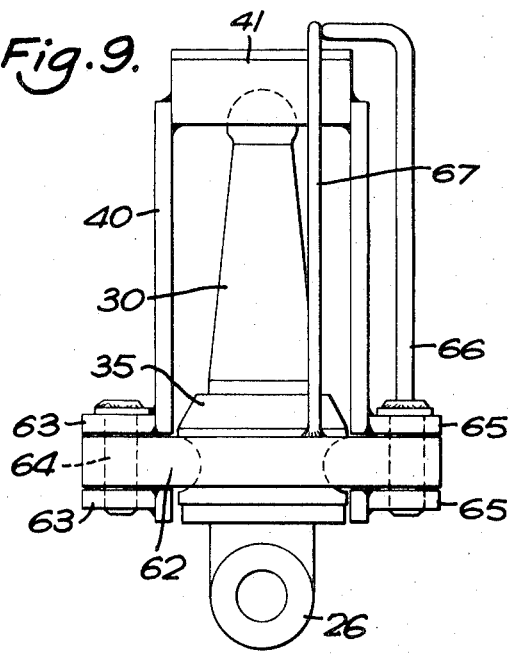
FIG. 9 is a front view of part of a modified connection.
Figure 10:
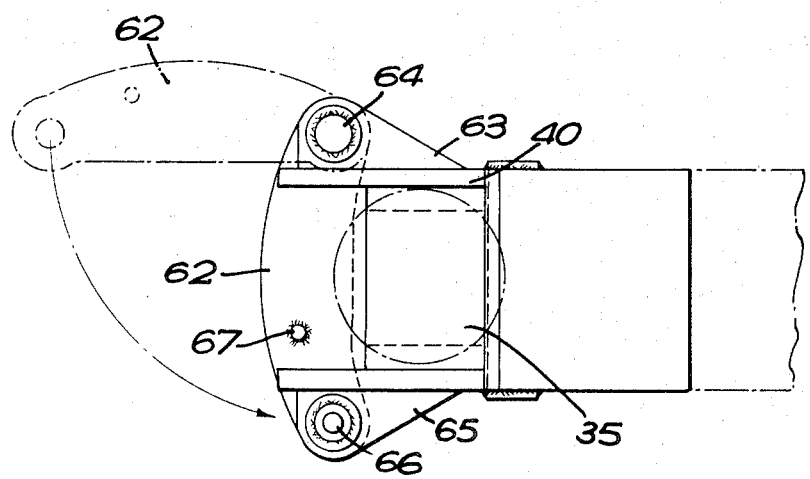
FIG. 10 is a plan view of the connection shown in FIG. 9.

FIGS. 9 and 10 illustrate a modified arrangement for locking the post 30 in the upright channel 40 which is particularly suitable for heavy duty applications of the towing connection. The pin 45 is replaced by a gate member 62 which is pivotally mounted between two spaced lugs 63 projecting from one side of the lower end of the channel on a pin 64 extending between the lugs. In the closed position the gate member 62 extends across the channel engaging the collar 35 on post 30 and is received between a second pair of lugs 65 projecting from the lower end of the other side of the channel. A locking pin 66 is inserted through apertures in the lugs and the end of the gate member between the lugs to hold the gate member in the closed position. To open the gate member the pin 66 is raised until it is clear of the gate member which can then be swung aside to permit the post 30 to be released from the channel 40. The gate member has an upstanding rigid arm 67 for use by the vehicle driver in opening and closing the gate and the upper end of the pin 66 is bent over to provide a horizontal leg to facilitate operation of the pin.

I claim:

1. A towing connection comprising a first coupling element, means for mounting said element on a towing vehicle for swinging movement about an axis extending transversely of the vehicle, a second coupling element adapted for mounting on a trailer, means for swinging said first element upwardly about said axis for engaging said first element with said second element and for raising said second element therewith, said first coupling element comprising an upwardly extending post having a spherical bearing at the upper end thereof, said second coupling element having a downwardly facing part-spherical bearing seat for the reception of said first element bearing seat, said first element further comprising an annular member rotatably mounted on said post below its spherical bearing, means for locking said first and second elements together when engaged against relative movement other than relative rotation about a vertical axis to permit, in use, articulation of the towing and towed vehicles about said vertical axis, and said annular member being constrained against axial movement with respect to said post and said locking means for securing said second element to said annular member.

2. A towing connection as claimed in claim 1 wherein the second coupling element comprises an upwardly extending channel closed at the upper end by said seat in which the post of the first element is received.

3. A towing connection as claimed in claim 2 wherein the locking means comprise a removable pin extending through holes in opposed walls of the channel and bearing against the annular member on the post within the channel to hold the post in the channel.

4. A towing connection comprising a first coupling element, two horizontally spaced swing arms for mounting said element on a towing vehicle for swinging movement about an axis extending transversely of the vehicle, a generally X-shaped structure mounted between said arms, said element being mounted between said arms at the center of said structure, a second coupling element adapted for mounting on a trailer, means for swinging said first element upwardly about said axis for engaging said first element with said second element and for raising said second element therewith, said first element being an upright post pivotally mounted at its lower end on said structure for rotation about a generally horizontal axis extending transversely to the axis of rotation of said swing arms so that the towing and towed vehicles can rotate about said horizontal axis with respect to one another, spring means on said structure for holding said post in an upright position before engagement between said first and second elements is made, and means for locking said first and second elements together when engaged against relative movement other than relative rotation about a vertical axis to permit, in use, articulation of the towing and towed vehicles about said vertical axis.

5. A towing connection as claimed in claim 4 wherein the post has a hub at its lower end which is mounted on a pin supported on the structure.

6. A towing connection as claimed in claim 4 wherein the forward limbs of the X-shaped structure have channel members at the ends thereof which engage around the swing arms.

7. A towing connection comprising a first coupling element, two horizontally spaced swing arms for mounting said element on a towing vehicle for swinging movement about an axis extending transversely of the vehicle, a generally X-shaped structure mounted between said arms, said element being mounted between said arms at the center of said structure, rearward limbs of said structure being connected by a tubular element, the ends of said swing arms being secured to said element by bolts extending through said arms and threaded to the ends of said elements, a second coupling element adapted for mounting on a trailer, means for swinging said first element upwardly about said axis for engaging said first element with said second element and for raising said second element therewith, and means for locking said first and second elements together when engaged against relative movement other than relative rotation about a vertical axis to permit, in use, articulation of the towing and towed vehicles about said vertical axis.

8. A towing connection as claimed in claim 7 wherein the ends of the arms have conventional ball trunnions through which the bolts extend.

\* \* \* \* \*